United States Patent
Butter et al.

(10) Patent No.: US 8,430,331 B2
(45) Date of Patent: Apr. 30, 2013

(54) STORAGE APPARATUS

(75) Inventors: Andrew Geoffrey Butter, Wotton-under-Edge (GB); David Adams, Cheltenham (GB); John Stuart Morse, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 844 days.

(21) Appl. No.: 12/450,983

(22) PCT Filed: Apr. 30, 2008

(86) PCT No.: PCT/GB2008/001509
§ 371 (c)(1),
(2), (4) Date: Oct. 21, 2009

(87) PCT Pub. No.: WO2008/132484
PCT Pub. Date: Nov. 6, 2008

(65) Prior Publication Data
US 2010/0122920 A1  May 20, 2010

(30) Foreign Application Priority Data

Apr. 30, 2007 (GB) .................................. 0708319.9

(51) Int. Cl.
*G05D 23/12* (2006.01)
(52) U.S. Cl.
USPC ........................................ 236/1 C; 62/259.2
(58) Field of Classification Search .................. 236/1 C; 62/259.2, 440; 73/431
See application file for complete search history.

(56) References Cited

U.S. PATENT DOCUMENTS

| | | | |
|---|---|---|---|
| 2,330,168 A | | 8/1941 | Zimmermann |
| 4,428,055 A | * | 1/1984 | Zurbrick et al. .............. 700/160 |
| 4,750,835 A | | 6/1988 | McMurtry |
| 4,979,284 A | | 12/1990 | McMurtry et al. |
| 5,001,842 A | | 3/1991 | Wright et al. |
| 5,028,901 A | | 7/1991 | Enderle et al. |
| 5,101,548 A | | 4/1992 | McMurtry et al. |
| 5,179,786 A | | 1/1993 | Shelton |
| 5,247,751 A | | 9/1993 | Ohya et al. |
| 5,270,664 A | | 12/1993 | McMurtry et al. |
| 5,327,657 A | | 7/1994 | Hajdukiewicz et al. |
| 5,339,956 A | | 8/1994 | Thomason |
| 5,393,288 A | | 2/1995 | Miyasaka et al. |
| 5,517,190 A | | 5/1996 | Gunn |

(Continued)

FOREIGN PATENT DOCUMENTS

| | | |
|---|---|---|
| DE | 42 11 813 C1 | 6/1993 |
| DE | 44 36 782 A1 | 4/1995 |

(Continued)

OTHER PUBLICATIONS

Harb et al.; "Resonator-based touch-sensitive probe;" *Sensors and Actuators A*; 1995; pp. 23-29; vol. 50.

(Continued)

*Primary Examiner* — Marc Norman
(74) *Attorney, Agent, or Firm* — Oliff & Berridge, PLC

(57) ABSTRACT

A storage apparatus for a measurement probe for use with a coordinate positioning machine. The storage apparatus including a storage unit having at least one receptacle for a measurement probe; and at least one temperature source for controlling the temperature of a measurement probe located in the at least one receptacle.

25 Claims, 6 Drawing Sheets

U.S. PATENT DOCUMENTS

| | | | |
|---|---|---|---|
| 5,646,049 | A | 7/1997 | Tayi |
| 5,675,902 | A | 10/1997 | Chase |
| 5,949,257 | A | 9/1999 | Ishikawa |
| 6,012,230 | A | 1/2000 | McMurtry et al. |
| 6,708,420 | B1 | 3/2004 | Flanagan |
| 7,041,963 | B2 | 5/2006 | El Rifai et al. |
| 7,096,077 | B2 | 8/2006 | Price et al. |
| 7,722,515 | B2 | 5/2010 | McMurty et al. |
| 7,861,430 | B2 | 1/2011 | Jonas et al. |
| 8,381,588 | B2 | 2/2013 | Butter et al. |
| 2003/0210235 | A1 | 11/2003 | Roberts |
| 2004/0184039 | A1 | 9/2004 | Christoph |
| 2004/0266595 | A1 | 12/2004 | Rosch |
| 2006/0129349 | A1 | 6/2006 | Raab et al. |
| 2006/0253206 | A1 | 11/2006 | Price et al. |
| 2010/0122920 | A1 | 5/2010 | Butter et al. |
| 2010/0132207 | A1* | 6/2010 | Mamour et al. ............... 33/503 |
| 2010/0206068 | A1* | 8/2010 | Butter et al. ................ 73/431 |
| 2011/0061253 | A1 | 3/2011 | Jonas et al. |

FOREIGN PATENT DOCUMENTS

| | | |
|---|---|---|
| DE | 44 42 247 A1 | 5/1996 |
| EP | 0 406 781 A2 | 1/1991 |
| EP | 0 690 286 A1 | 1/1996 |
| EP | 0 856 377 A1 | 8/1998 |
| GB | 2 006 435 A | 5/1979 |
| GB | 2 070 249 A | 9/1981 |
| GB | 2 295 565 A | 6/1996 |
| GB | 2 348 706 A | 10/2000 |
| GB | 2 407 718 A | 5/2005 |
| JP | A-61-047502 | 3/1986 |
| JP | A-02-152769 | 6/1990 |
| JP | A-07-167638 | 7/1995 |
| JP | A-09-285965 | 11/1997 |
| WO | WO 89/07745 A1 | 8/1989 |
| WO | WO 90/07097 A1 | 6/1990 |
| WO | WO 00/60310 A1 | 10/2000 |
| WO | WO 03/002296 A1 | 1/2003 |
| WO | WO 03/051575 A1 | 6/2003 |
| WO | WO 03/053630 A1 | 7/2003 |
| WO | WO 03/089188 A1 | 10/2003 |
| WO | WO 2004/007143 A1 | 1/2004 |
| WO | WO 2007/093789 A1 | 8/2007 |
| WO | WO 2007/129071 A1 | 11/2007 |
| WO | WO 2007/129082 A1 | 11/2007 |
| WO | WO 2008/132484 A1 | 11/2008 |

OTHER PUBLICATIONS

International Search Report issued in International Application No. PCT/GB2008/001508; Mailed on Sep. 15, 2008.

British Search Report issued in Great Britain Application No. 0708319.9; Feb. 15, 2008.

British Search Report issued in Great Britain Application No. 0708319.9; Aug. 20, 2007.

British Search Report issued in Great Britain Application No. 0715799.3; Dec. 11, 2007.

International Search Report issued in International Application No. PCT/GB2007/001667; Mailed on Jan. 8, 2008.

U.S. Appl. No. 12/226,731, filed Oct. 27, 2008 in the name of Weston et al.

U.S. Appl. No. 12/450,983, filed Oct. 21, 2009 in the name of Butter et al.

U.S. Appl. No. 12/450,898, filed Oct. 21, 2009 in the name of Butter et al.

Mar. 15, 2012 Office Action issued in U.S. Appl. No. 12/450,982.

Feb. 21, 2012 Office Action issued in U.S. Appl. No. 12/450,898.

Oct. 5, 2010 Notice of Allowance and Fee(s) Due issued in U.S. Appl. No. 12/226,731.

Nov. 15, 2012 Notice of Allowance issued in U.S. Appl. No. 12/450,898.

Dec. 21, 2012 Office Action issued in U.S. Appl. No. 12/450,982.

\* cited by examiner

STORAGE APPARATUS

This invention relates to a storage apparatus for a measurement probe for use with a coordinate positioning machine, coordinate measuring machines and the like, such as scanning tools and tool bits used in high precision measuring, and a method of storing a measurement probe.

Tools can be used by coordinate positioning machines for a number of different applications, such as for measuring or for machining an object. Example tools include metrological devices such as scanning devices, probes and styli, and tool bits such as drill bits and burring tools. It is known to provide a plurality of interchangeable tools for use with the same coordinate positioning machine so that the coordinate positioning machine can be used for a plurality of different types of operation to suit different types of measuring and machining applications.

It is also known to provide a rack for storing tools which are not in use by the coordinate positioning machine. The rack can be stored within the coordinate positioning machine's working area so that it is possible for the coordinate positioning machine to automatically load and unload tools from and to the rack.

It is known for measurement probes to contain electrical components, such as components for performing measurement, e.g. lasers in optical analogue scanning probes, or for example storing data about the measurement probe. A known rack comprises a number of receptacles each having a pair of floating pins which provide electrical connection to a laser within an analogue scanning measurement probe located in a receptacle, via a corresponding pair of contacts on the side of the probe body. The probe body has a set of electrical connectors separate to the pair of contacts via which power is supplied to the probe when in use on a coordinate positioning machine. This separate set is provided on a different region of the measurement probe. In particular, the separate set is provided on the probe body's contact face (i.e. the face which is for engagement with the head of a coordinate positioning machine) as opposed to the side of the probe body. The rack is configured such that when a probe is located in the receptacle, power can be supplied to a laser in the probe via the pair of contacts on the probe body's side in order to keep the laser turned on. This avoids the need to wait for the laser to warm up when the probe is loaded onto a coordinate positioning machine. The pin connectors are provided at the back of the receptacle. Connection between the pin connectors and the pair of contacts on the side of the probe body is formed by pushing the probe into the receptacle. The pin connectors and contacts on the side of the probe body can be disconnected by pulling the probe away from the pin connectors and out of the receptacle.

However, the part of the coordinate positioning machine onto which the tools are loaded can become warm during operation. This in turn can cause the temperature of a tool loaded on the coordinate positioning machine to increase which can cause changes to the geometry of the tool.

According to a present invention there is provided a storage apparatus for a measurement probe for use with a coordinate positioning machine, comprising: a storage unit having at least one receptacle for a measurement probe; and at least one temperature source for controlling the temperature of a measurement probe located in the at least one receptacle.

The temperature of the measurement, probe can be controlled via the temperature source so as to reduce or eliminate any change in the temperature of the measurement probe once it has been loaded onto a coordinate positioning machine. This can increase the efficiency and the reliability of the operation in which the measurement probe is used.

The temperature source could be configured to target a selected portion of a measurement probe located in the receptacle. Targeting only a selected portion of a measurement probe can provide improved control over the temperature of a measurement probe received in the receptacle, for instance when compared to a storage apparatus in which the whole of the measurement probe is uniformly heated or cooled. It can also better replicate the environment the measurement probe will be exposed to when it is in use on a coordinate position machine.

As will be understood, the receptacle is the part of the storage unit which can receive a measurement probe for storage. The receptacle could be configured to receive a single measurement probe only. The receptacle can be defined by features which can support a measurement probe located in the receptacle. The receptacle could comprise features for engagement with corresponding engagement features on a measurement probe. For instance the receptacle could comprise at least one projection for engagement with a corresponding groove on a measurement probe. Optionally, the receptacle could comprise at least one recess for engagement with a corresponding projection on a measurement probe.

As will be understood, targeting only a selected portion of a measurement probe received in the receptacle does not mean that the temperature of other portions of the measurement probe will not be affected. Rather the temperature of other portions of the measurement probe may be indirectly affected by the temperature source. However, as they are not targeted by the temperature source, the effect on them will be less. Accordingly, this will result in a temperature gradient across the measurement probe. As will be understood, the degree of the temperature gradient will depend on the thermal conductivity of the measurement probe.

Preferably the storage apparatus is configured such that when a measurement probe is located in the receptacle the temperature source is configured to target at least a part of the measurement probe's coordinate position machine contact portion. The measurement probe's coordinate position machine contact portion is the region of the probe which engages the head of a coordinate positioning machine when in use. This region typically comprises features which facilitate engagement with the head of a coordinate positioning machine. As will be understood, the head can be part of the quill of a coordinate positioning machine.

Preferably, the storage apparatus is configured such that the temperature source targets a first end of the measurement probe located in the receptacle. Preferably, the first end is the end of the measurement probe which is for engagement with a head of a coordinate positioning machine. This is often referred to as the measurement probe's contact face. Preferably, the temperature source is configured to modulate the temperature of the measurement probe substantially uniformly over its contact face.

At least a part of the at least one temperature source can extend over the selected portion of a measurement probe located in the receptacle.

The storage unit can comprise the at least one temperature source. As will be understood, in embodiments in which there are a plurality of receptacles, there can be provided a single temperature source for controlling the temperature of measurement probes located in at least two of the plurality of receptacles. Optionally, a plurality of temperature sources could be provided. For instance, there could be provided at least one temperature source per receptacle. Accordingly, the at least one receptacle could comprise the at least one temperature source.

Preferably, at least a part of the temperature source is displaceable relative to the receptacle. This enables, for example, the temperature source to be positioned in a region of the measurement probe which needs to be accessed, for instance by a coordinate positioning machine, during the at least one of the acts of storing and removal of a measurement probe in a receptacle.

Preferably, at least a part of the temperature source is displaceable relative to the receptacle between a closed position in which the temperature source extends over a selected portion of a measurement probe located in the receptacle and an open position in which the selected portion is exposed. This enables the selected portion to be accessed by, for example, the head of a coordinate positioning machine for automatic storing and retrieval of measurement probe in the storage apparatus.

Preferably, the temperature source comprises at least one temperature element and at least one temperature conducting arm. Preferably the arm is displaceable relative to the receptacle. Optionally, the at least one temperature element is fixed relative to the arm. That is the temperature source could be mounted on the arm. The temperature source could be mounted on the arm such that the temperature source directly affects the temperature of a measurement probe received in the receptacle.

The arm could be hinged such that it can pivot relative to the receptacle. Optionally, the arm could be slidingly mounted such that the arm can be slid relative to the receptacle.

The at least one temperature element could be provided separate to the at least one arm such that the arm is displaceable relative to the temperature element. In this case, preferably, the at least one heating element is mounted on the storage unit such that it is fixed relative to the receptacle. This arrangement avoids the need to provide a flexible electrical connection to the at least one temperature element. Such an electrical connection could be between the at least one temperature element and a temperature control device (described in more detail below).

Preferably, the storage apparatus further comprises a temperature control device for modulating the temperature source. However, as will be understood, the temperature control device could be provided separately to the storage apparatus. For instance, the temperature control device could be a computer or other processing device separate to the storage apparatus and connected to the temperature source. In this case the storage apparatus can comprise a connector for connecting the temperature source to a temperature control device.

The temperature source could be a cooling device. Accordingly, the temperature source could be configured to cool a measurement probe located in the receptacle. As will be understood, suitable cooling devices comprise any such devices which are operable to remove heat from a measurement probe located in the receptacle. For instance, the temperature source can comprise a Peltier device.

The temperature source could be a heat source. Accordingly, the heat source could be configured to heat a measurement probe located in the receptacle. Accordingly, at least a part of the heat source could be configured to extend over the contact face of a measurement probe located in the receptacle. As will be understood, there are many suitable heat sources for use with the present invention. Preferably, the heat source comprises a resistor. Preferably, the heat source comprises an arrangement of resistors.

The storage apparatus is suitable for storing measurement probes. Accordingly, preferably the storage apparatus provides for substantially dry storage. Measurement probes suitable for storing in the storage apparatus of the present invention include contact probes, non-contact probes, analogue probes and touch trigger probes. The rack could also be used to store other types of metrological device such as styli for use on a probe body. As will be understood, the storage apparatus could also be used to store other types of devices and tools. For example, the storage apparatus could be used to store a bit for machining an object, such as a drill bit.

The temperature source could be configured such that the measurement probe can be maintained at a predetermined temperature. The predetermined temperature can be the operating temperature of the measurement probe. The operating temperature is the stable temperature the measurement probe reaches once it has been loaded onto a coordinate positioning machine. Accordingly, the operating temperature can be affected by ambient temperature, the temperature of the head of the coordinate positioning machine on which the measurement probe is loaded, and/or the temperature of any electrical components within the measurement probe itself. Maintaining the measurement probe at the operating temperature is advantageous as it helps to ensure that there will be substantially no change in the temperature of the measurement probe once it is loaded onto the coordinate positioning machine, and hence further improves the efficiency and the accuracy of the operation in which the measurement probe is used. As will be understood, as the operating temperature can be affected by external factors, such as the ambient temperature, the operation temperature is not necessarily a stable temperature. However, in this case the operating temperature could be determined by monitoring the external factors, for example the ambient temperature.

The temperature source could be configured to directly control the temperature of a measurement probe located in the receptacle. For instance, in embodiments in which the temperature source is a heat source, the heat source could be configured to directly heat a measurement probe received in the receptacle. For example, the heat source could be at least one heating element controllable to emit heat. For instance, a heating element could be a resistor configured to emit heat on the passage of a current through it. Optionally, the heat source could be at least one laser source configured to direct a laser at a measurement probe received in the receptacle.

Optionally, the temperature source could be configured to indirectly control the temperature of a measurement probe located in the receptacle. For example, the temperature source could comprise a temperature element and a conductor for conducting temperature from the temperature element to a measurement probe located in the receptacle. For instance, in embodiments in which the temperature source is a heat source, the heat source could be configured to indirectly heat a measurement probe received in the receptacle. The heat source could comprise a heating element and a heat transfer member for transferring heat from the heating element to a measurement probe received in the receptacle. The heat source could be in direct thermal contact with the heat transfer member. Optionally, the heat source could be spaced apart from the heat transfer member. The heat transfer member can be configured to be in direct thermal contact with at least a part of a measurement probe received in the receptacle. Optionally, the heat transfer member can be configured such that it is spaced apart from a measurement probe received in the receptacle. Accordingly, the transfer of heat to and from the heat transfer member from and to the heat source and measurement probe respectively, can be done via convection or conduction.

Optionally, the storage unit comprises at least one electrical connector for electrically connecting the temperature control device to an electrical component in a measurement probe received in the receptacle. Optionally the electrical component is a heat source. This enables the temperature of a measurement probe received in the receptacle via a temperature source internal and external to the measurement probe.

The temperature control device could be a power source configured to supply power to the temperature source. For instance, the power source could be an electrical input configured to receive electrical current from an external source, such as the mains power supply. Preferably, the power source is configured to regulate a predetermined electric current supply to the temperature source in order to activate the temperature source.

The temperature control device could be configured such that it can control the temperature of the temperature source. The temperature control device could be configured to control the temperature source such that it is controlled to a constant temperature differential to the ambient temperature. For instance, the temperature control device could be configured to control the temperature source such that it is controlled to a constant temperature above or below the ambient temperature.

Preferably, the temperature control device is configured to respond to an input in order to control the temperature of the temperature source. This is advantageous especially when the temperature at which the measurement probe is to be maintained can change. The storage apparatus could comprise an input mechanism. The input mechanism could comprise a user input mechanism which enables the user to control the temperature of the temperature source. The user input mechanism could be a switch which enables the user to select the temperature of the temperature source. The switch could control the amount of power supplied to the temperature source.

The input mechanism could comprise a sensor. The sensor could be a temperature sensor. The temperature sensor could be configured to detect the ambient temperature. The temperature sensor could be configured to detect the temperature of a measurement probe received in the at least one receptacle. The temperature sensor could be configured to detect the temperature of a part of the storage apparatus. The sensor could be configured to detect the temperature of the at least one receptacle. The sensor could be configured to detect the temperature of the temperature conductor. The sensor could be configured to detect the temperature of the temperature conducting arm. The input mechanism could comprise any combination of one or more of the above mentioned input mechanisms. The temperature control device could be configured to control the temperature of the temperature source based on the input of one or more of the above mentioned input mechanisms.

Preferably, the temperature control device is configured to receive a signal indicative of the operating temperature of a measurement probe received in the receptacle. Preferably, the temperature control device is configured to control the temperature source in order to maintain the temperature of the measurement probe at the operating temperature. This is advantageous as it enables the operating temperature of each measurement probe received in the receptacle to be learnt.

The signal can be received from a coordinate positioning machine on which a measurement probe to be stored in the storage unit is loaded. Optionally, the storage apparatus can comprise a temperature sensor. For example, the storage unit could comprise a temperature sensor. Accordingly, the temperature control device can be configured to receive the signal indicative of the operating temperature of a measurement probe received in the receptacle from a temperature sensor located in the storage unit. Preferably, the temperature control device is configured to receive the signal indicative of the operating temperature of the measurement probe from a temperature sensor located in the measurement probe. This is advantageous as the operating temperature can be signalled to the temperature control device as soon as it is received in the storage unit.

The temperature control device could be configured to receive a signal indicative of the ambient temperature. Optionally, the temperature control device is configured to take into account the current ambient temperature and the operating temperature of a measurement probe when it was received in the at least one receptacle when controlling the temperature of the heat source. Changes in the ambient temperature could cause the operating temperature of the measurement probe received in the at least one receptacle to change when it is next loaded on a coordinate positioning machine. Accordingly, the temperature control device could control the temperature source to compensate for any changes in the ambient temperature.

The temperature control device could be configured to receive from a temperature sensor a signal indicative of the temperature of the measurement probe received within a receptacle. The temperature sensor could be provided by the storage apparatus. The temperature sensor could be provided by the storage unit. The temperature sensor could be provided by the receptacle. The temperature sensor could be provided by the measurement probe itself. The temperature sensor could be the same sensor as the temperature sensor that indicates the operating temperature of the measurement probe. The temperature control device could be configured to servo the heat source using the signal from the temperature sensor.

The temperature control device could be configured to servo the temperature source so that the temperature sensor reads a temperature that is different to the operating temperature. This could be advantageous in circumstances in which the output of the temperature sensor does not accurately represent the temperature of the measurement probe. For instance, this could be the case when the temperature source is configured such that it does not evenly control the temperature of the measurement probe.

The storage unit could comprise a device for detecting when a measurement probe is received in the receptacle. The temperature control device could be configured to activate the temperature source only when a measurement probe is received in the receptacle.

Some measurement probes have electronic components which are powered by a coordinate positioning machine when loaded on a coordinate positioning machine. Preferably, the storage unit comprises at least one electrical connector for supplying electric power to at least one electrical component in a measurement probe received within the receptacle. This can enable any electrical components in the measurement probe to be maintained in a ready mode, so that they are ready for operation as soon as the measurement probe is loaded on a coordinate positioning machine.

Such measurement probes typically have at least one electrical power supply connector which connect with corresponding electrical power supply connectors on the coordinate positioning machine in order to supply power to the electronic components from the coordinate positioning machine's power supply. Such measurement probes can also have electrical data connectors which connect with corresponding electrical data connectors on the coordinate positioning machine in order to send data between the measurement probe and the coordinate positioning machine. Preferably, the storage unit's connectors are configured to connect with the measurement probe's at least one coordinate positioning machine power supply connector. This is advantageous as it avoids the need to provide different connectors on the measurement probe for receiving power from the coordinate positioning machine and from the storage unit. When the storage unit comprises an arm, preferably the storage unit's connectors are provided on the arm.

Preferably, the storage unit comprises a plurality of receptacles, each for receiving a measurement probe. Preferably, the temperature control device is configured to control at least one heat source in order to maintain the temperature of a measurement probe received in each of the plurality of receptacles. More preferably, the temperature control device is configured to control a plurality of heat sources in order to maintain the temperature of a measurement probe received in each of the plurality of receptacles. For example, the storage unit could comprise a heat source associated with each receptacle, and the temperature control device could be configured to control each heat source individually.

The storage unit could comprise at least one arm configured to extend over at least a part of the contact face of a measurement probe received in the at least one receptacle.

Preferably, the arm is configured to cover at least 50% of the contact face of a measurement probe located in the receptacle, more preferably at least 75%, especially preferably at least 100%. Preferably the arm is configured to extend over the entire contact face of a measurement probe received in the at least one receptacle. In these cases the arm can act as a protective cover. The contact face of a measurement probe is its face which is for engagement with a coordinate positioning machine. Optionally, the arm could carry at least one electrical connector for electrically connecting the measurement probe to another electrical device.

The temperature source could be mounted on the arm. The temperature source could be mounted on the arm such that the temperature source directly affects the temperature of a measurement probe received in the receptacle. Optionally, the arm is a temperature conductor. In this case, the at least one temperature source could be mounted on the arm such that the at least one temperature source indirectly heats a measurement probe received in the receptacle.

For instance, a heating element could be mounted on the arm. The at least one heating element could be mounted on the arm such that the at least one heating element directly heats a measurement probe received in the receptacle. Optionally, the arm is a heat transfer plate. In this case, the at least one heating element could be mounted on the arm such that the at least one heating element indirectly heats a measurement probe received in the receptacle.

Preferably, the arm is displaceable relative to the receptacle so as to be able to expose the contact face of a measurement probe received in the receptacle. This is advantageous as it enables easy access to the receptacle during the changing of measurement probes. In this case, preferably, the at least one heating element is mounted on the storage unit such that it is fixed relative to the receptacle. Accordingly, preferably the arm is displaceable relative to the at least one heating element. This arrangement avoids the need to provide a flexible electrical connection between the at least one heating element and the temperature control device.

Accordingly, the application describes a storage apparatus for a tool for use with a coordinate positioning machine, comprising: a storage unit having at least one receptacle for a tool; a temperature control device configured to control a heat source so as to maintain the temperature of a tool located in the receptacle substantially at a predetermined temperature. The predetermined temperature can be the operating temperature of the tool.

The storage unit can comprises a heat source controllable by the temperature control device. The heat source can comprise a heating element and a heat transfer member for transferring heat from the heating element to a tool received in the receptacle. The heat transfer member can comprise an arm which is configured to extend over at leak a part of the contact face of a metrological device which is for contact with a coordinate positioning machine, when the tool is received in the receptacle. The arm can be displaceable relative to the receptacle so as to be able to expose the contact face of a tool received in the receptacle. The heating element can be provided as part of the arm so that the arm and heating element are fixed relative to each other. The heating element can be provided as a separate piece to the arm such that the arm is displaceable relative to the heating element.

According to a second aspect of the invention there is provided a kit comprising a storage apparatus for a measurement probe for use with a coordinate positioning machine, the storage apparatus having a storage unit having at least one receptacle for a measurement probe and at least one temperature source for controlling the temperature of a measurement probe located in the at least one receptacle; the kit further comprising a measurement probe for location in the at least one receptacle.

As will be understood, references to measurement probe include probes for measuring the dimensions of a workpiece, including contact probes and non-contact probes. Contact probes normally comprise a stylus attached to the probe body. The stylus normally comprises a tip for contacting a workpiece. Contact probes include rigid stylus probes and stylus deflection probes. Stylus deflection probes operate by detecting the deflection of the stylus when it is driven against a workpiece. Componentry for detecting deflection of the stylus is typically housed within the probe body.

Non-contact probe can measure the dimensions of the workpiece without contacting the workpiece. Non-contact probes include optical probes, capacitive probe and inductive probes, such as those disclosed in U.S. Pat. No. 4,750,835 and U.S. Pat. No. 5,270,664, the contents of which are incorporated into this specification by these references. The sensors of non-contact probes are typically contained within the probe body.

Measurement probes can be classed as analogue probes in which a range of values can be measured (e.g. the extent of deflection of a stylus of a contact probe), or dual state probes (also commonly referred to as touch-trigger probes) in which typically only one of two states can be determined (e.g. whether or not a stylus of a contact probe is deflected or not). References to measurement probes in this application is intended to include references to both of these types of measurement probe.

As will be understood, the above mentioned features in connection with the first aspect of the invention are suitable for use with the second aspect of the invention.

According to a third aspect of the invention there is provided a method of storing a measurement probe for use with a coordinate positioning machine in a storage unit, comprising: locating the measurement probe in the storage unit, the storage unit having a temperature source; and controlling the temperature of the measurement probe via the temperature source.

The method can comprises maintaining the temperature of the measurement probe substantially at a predetermined temperature. The predetermined temperature can be the operating temperature of the measurement probe.

The method can comprise maintaining the heat source at a constant amount above ambient temperature. Optionally, the method comprises determining the operating temperature of the measurement probe. The method can comprise maintaining the temperature of the measurement probe substantially at the measurement probe's operating temperature. Optionally, the method comprises determining the ambient temperature. Optionally, the method comprises basing the temperature at which it will maintain the tool on the operating temperature and the ambient temperature.

As will be understood, the features described above in connection with the first and second aspects of the invention are suitable for incorporation into the third aspect of the invention.

According to a fourth aspect of the invention there is provided a storage apparatus for a tool for use with a coordinate positioning machine, comprising: a storage unit having at least one receptacle for a tool; at least one connector for electrically connecting to any electrical components in a tool received in the receptacle via the tool's at least one coordinate positioning machine electrical connector.

The at least one connector could be used to transfer data between a processor in the storage unit and the tool. Optionally, the at least one connector is for supplying electric power to any electrical components in a tool received in the receptacle via the tool's at least one coordinate positioning machine power supply connector.

The storage unit could comprise at least one arm configured to extend over at least a part of the contact face of a tool received in the at least one receptacle. The arm could carry the at least one electrical connector. Preferably the arm extends over the entire contact face of a tool received in the at least one receptacle. The contact face of a tool is its face which is for engagement with a coordinate positioning machine. The arm could be used as a cover to protect at least a part of the contact face.

Preferably, the arm is displaceable relative to the receptacle so as to be able to expose the contact face of a tool received in the receptacle. This is advantageous as it enables easy access to the receptacle during loading and unloading of a coordinate positioning machine.

Preferably the at least one electrical connector is mounted on the arm via a flexible mount such that the at least one electrical connector can move relative to the arm. This can improve the contact between the storage unit's at least one electrical connector and the electrical connector on a tool.

According to a fifth aspect of the invention, there is provided a tool for use with a coordinate positioning machine, comprising a heat source operable to maintain the temperature of the tool at the operating temperature of the tool.

An embodiment of the invention will now be described, by way of example, and with reference to the following drawings, in which.

Figure 1:
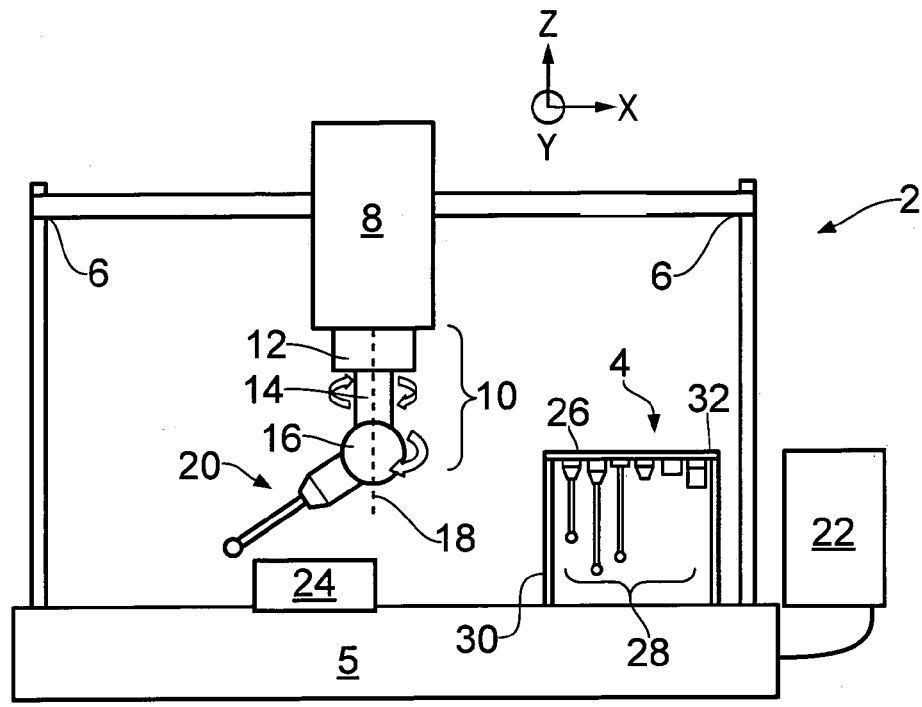
FIG. 1 shows a storage apparatus according to the present invention located for use with a coordinate measuring machine.

Referring to FIG. 1, a coordinate measuring machine (CMM) 2 in which a storage apparatus 4 according to the present invention is located is shown. The CMM 2 will be described for purposes of background information only. As will be understood, the CMM 2 does not form a part of the present invention.

The CMM 2 comprises a base 5, supporting a frame 6 which in turn holds a quill 8. Motors (not shown) are provided to move the quill 8 along the three mutually orthogonal axes X, Y and Z. The quill 8 holds an articulating head 10. The head 10 has a base portion 12 attached to the quill 8, an intermediate portion 14 and a probe retaining portion 16. The base portion 12 comprises a first motor (not shown) for rotating the intermediate portion 14 about a first rotational axis 18. The intermediate portion 14 comprises a second motor (not shown) for rotating the probe retaining portion 16 about a second rotational axis that is substantially perpendicular to the first rotational axis. Although not shown, bearings may also be provided between the moveable parts of the articulating head probe.

A measurement probe 20 is removably attached (e.g. using a kinematic mount) to the probe retaining portion 16. The measurement probe 20 can be held by the probe retaining portion 16 by the use of corresponding magnets (not shown) provided on or in the measurement probe 20 and probe retaining portion 16. The measurement probe 20 may be a touch trigger probe or an analogue probe including a stylus. The probe may comprise an optical sensor. Alternatively, the probe may be a non-contacting probe such as an optical probe.

A machine controller 22 for controlling the operation of the CMM 2 is also provided. The machine controller 22 may be a dedicated electronic control system and/or may comprise a personal computer.

The head 10 allows the measurement probe 20 to be moved with two degrees of freedom relative to the quill 8. The combination of the two degrees of freedom provided by the head 10 and the three linear (X, Y, Z) axes of translation of the CMM allows the measurement probe 12 to be moved about five axes. This permits so called "five-axis" measurements of an associated part 24 mounted to the base portion 5 of the machine.

The storage apparatus 4 comprises a storage unit 26 having a plurality of receptacles for receiving a plurality of different types of measurement probes, styli and modules 28.

During operation of the CMM 2, the quill 8, and head 10 can become warm due to the working of the motors and the electrical components within them. The inventors have found that this warmth is transferred to the measurement probe 20 loaded on the head 10. They have also found that the change in temperature of the measurement probe 20 can significantly degrade the coordinate measurement accuracy and/or efficiency.

Figure 2:
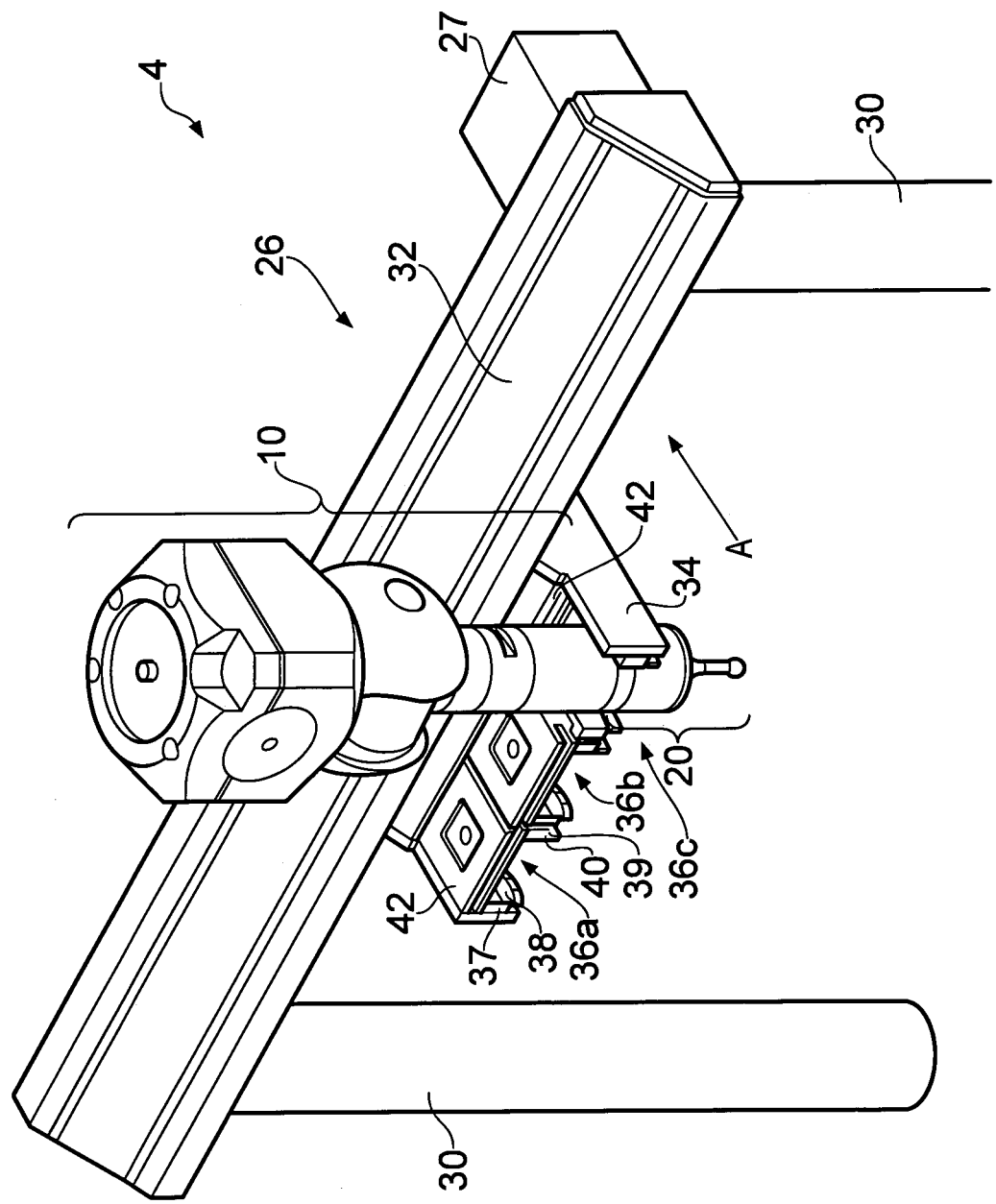
FIG. 2 is a perspective view of a first embodiment of a storage apparatus according to the present invention.
Figure 3:
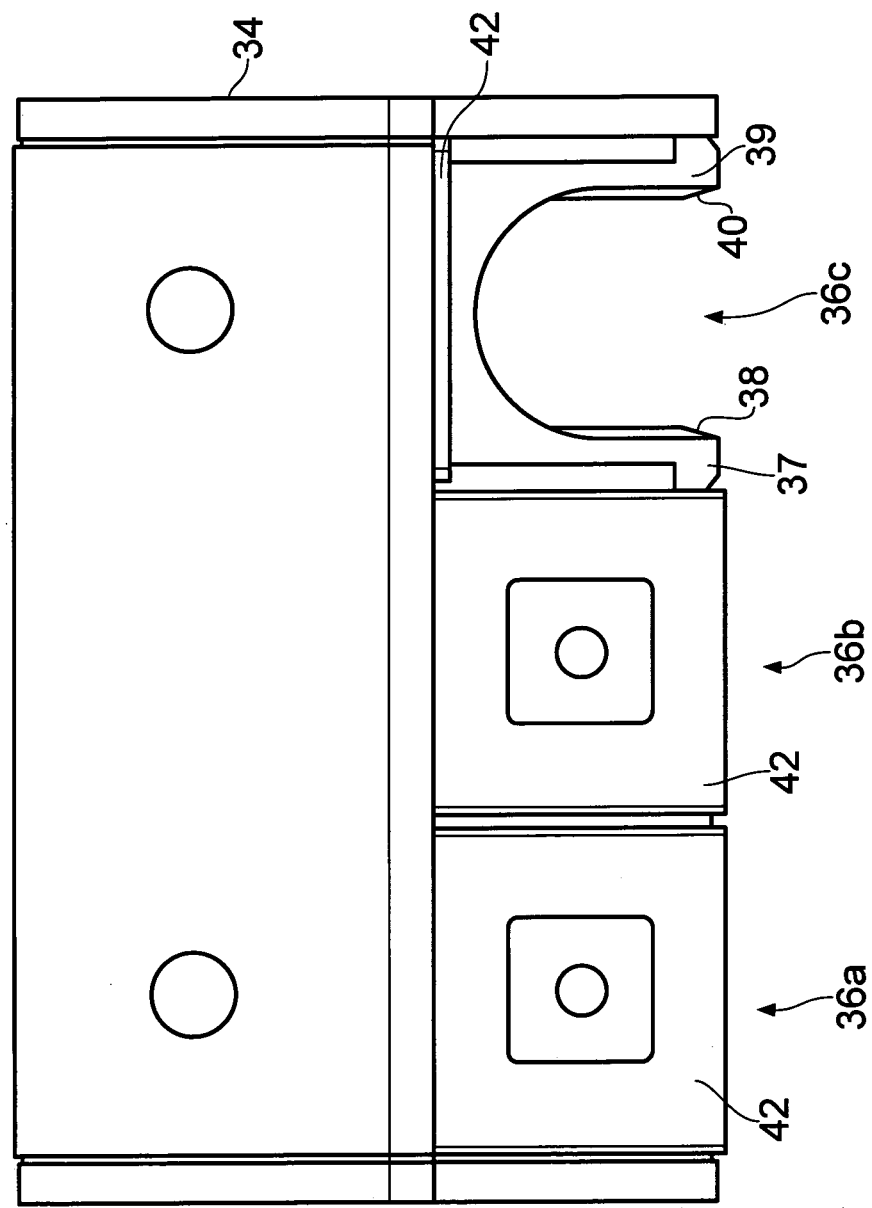
FIG. 3 is a plan view of the receptacle housing of the storage apparatus shown in FIG. 2.
Figure 4:
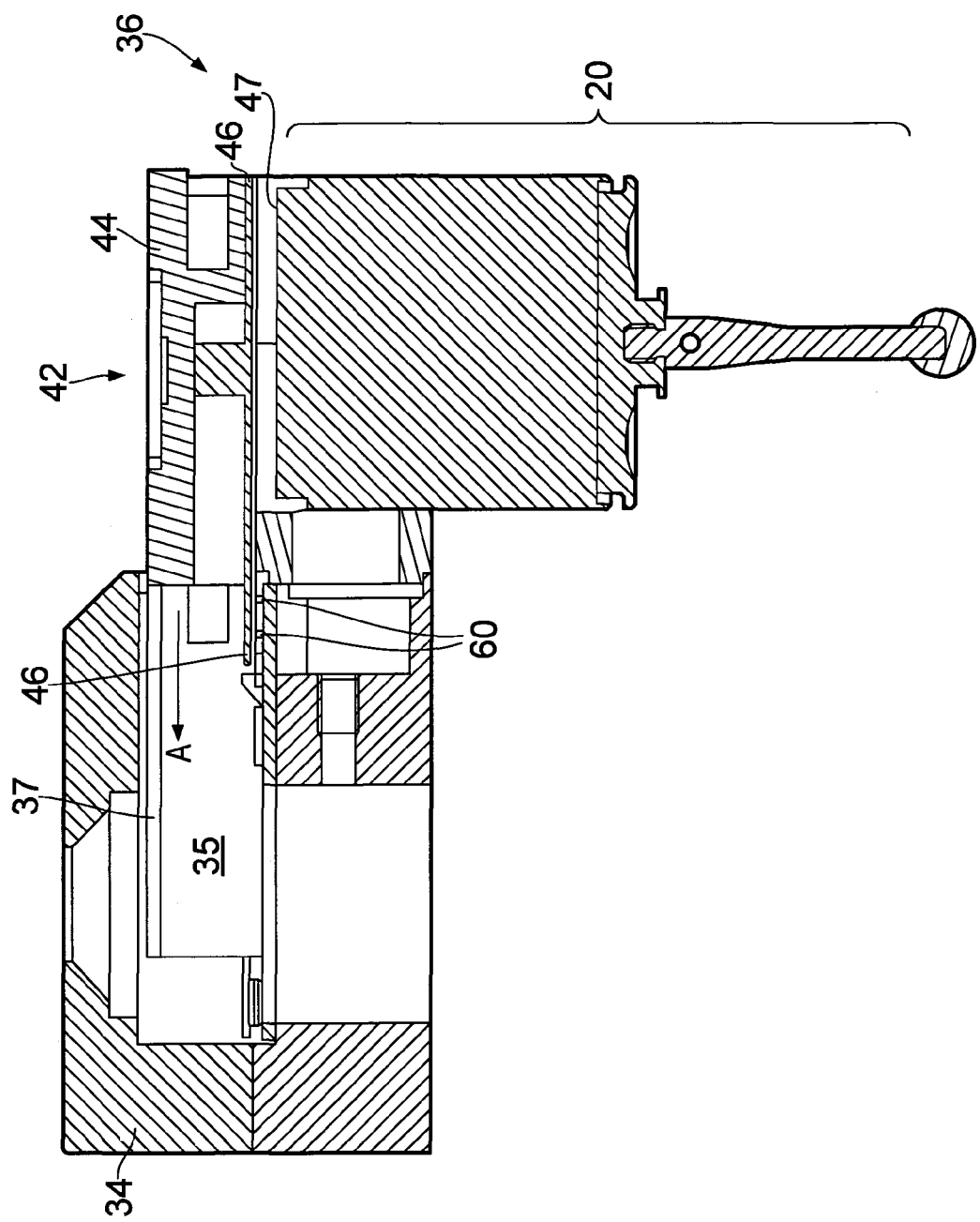
FIG. 4 is a cross-sectional view of a receptacle and the receptacle housing shown in FIGS. 2 and 3.

With reference to FIGS. 2 to 4, there is shown a storage apparatus 4 according to a first embodiment of the present invention. The storage apparatus 4 shown in FIGS. 2 to 4 is particularly suitable for storing metrological devices which do not contain electrical components. The storage apparatus 4 comprises a storage unit 26 and a temperature control device 27. Although shown as a unit attached to the rack 32, the temperature control device 27 could be provided separately to the storage unit 26, or could, for instance, be located within the receptacle housing 34. The storage unit 26 comprises upright supports 30 mounted to the base 5 of the CMM 2 and a rack 32 supporting a receptacle housing 34 which has a plurality of receptacles 36a, 36b, 36c for receiving metrological devices such as measurement probes, styli, modules and tool bits.

Each receptacle 36 comprises first 37 and second 39 side walls defining first 38 and second 40 directly opposing ribs for cooperation with corresponding grooves on a metrological device, such as the measurement probe 20, to be received in the receptacle. The first 38 and second 40 ribs are provided so as to guide the measurement probe into the receptacle 36. The first 38 and second 40 ribs, and the corresponding grooves on a device to be received in the receptacle are also shaped and sized such that the measurement probe 20 can be received in one orientation only.

Each receptacle 36 also comprises a protective cover 42 extending between the first 37 and second 39 side walls. Each protective cover 42 is biased into the closed position (as illustrated by the covers for receptacles 36a and 36b shown in FIGS. 2 and 3) but can be pushed into a void 35 in the receptacle housing 34 in the direction illustrated by arrow A. This enables the measurement probe 20 to be slid into the receptacle 36 via the head 10 which is holding the measurement probe 20 from the measurement probe's 20 upper face (as illustrated by the cover for receptacle 36c shown in FIGS. 2 and 3).

Referring to FIG. 4 there is shown a cross-sectional view of one of the receptacles 36. The receptacle 36 includes a protective cover 42 which comprises an outer shell 44 made of a plastics material such as a PTFE impregnated thermo plastic, and a heat transfer plate 46 made of a metallic material such as aluminium. As shown, the receptacle 36 and protective cover 42 are configured such that when a measuring probe 20 is received in the receptacle 36, the measuring probe 20 will be spaced apart from the heat transfer plate 46.

The protective cover 42 is mounted so that it can slide, along rails 37, into the receptacle housing 34 in the direction illustrated by arrow A. A bias mechanism (not shown) biases the protective cover 42 towards the closed position shown in FIG. 4.

The receptacle 36 further includes a heat source in the form of a heating element 60, for example a resistor, which is mounted on the receptacle housing 34. The heating element 60 is electrically connected to the temperature control device 27 via wires (not shown). The heating element 60 and the heat transfer plate 46 are configured such that the heating element 60 heats the heat transfer plate 46. The heat transfer plate 46 in turn heats the measuring probe 20 received in the receptacle 36 from the measuring probe's 20 contact face 47 downwards. The heating element 60 is spaced a small distance away from the heat transfer plate 46 so that it does not interfere with the displacement of the protective cover 42 during use.

Figure 5:
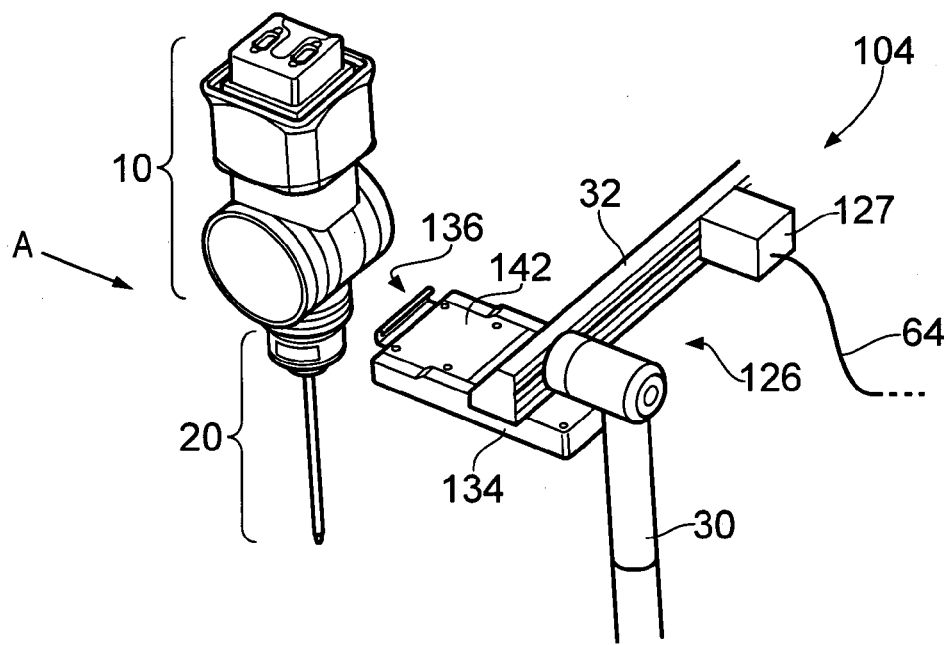
FIG. 5 is a perspective view of a second embodiment of a storage apparatus according to the present invention.
Figure 7:
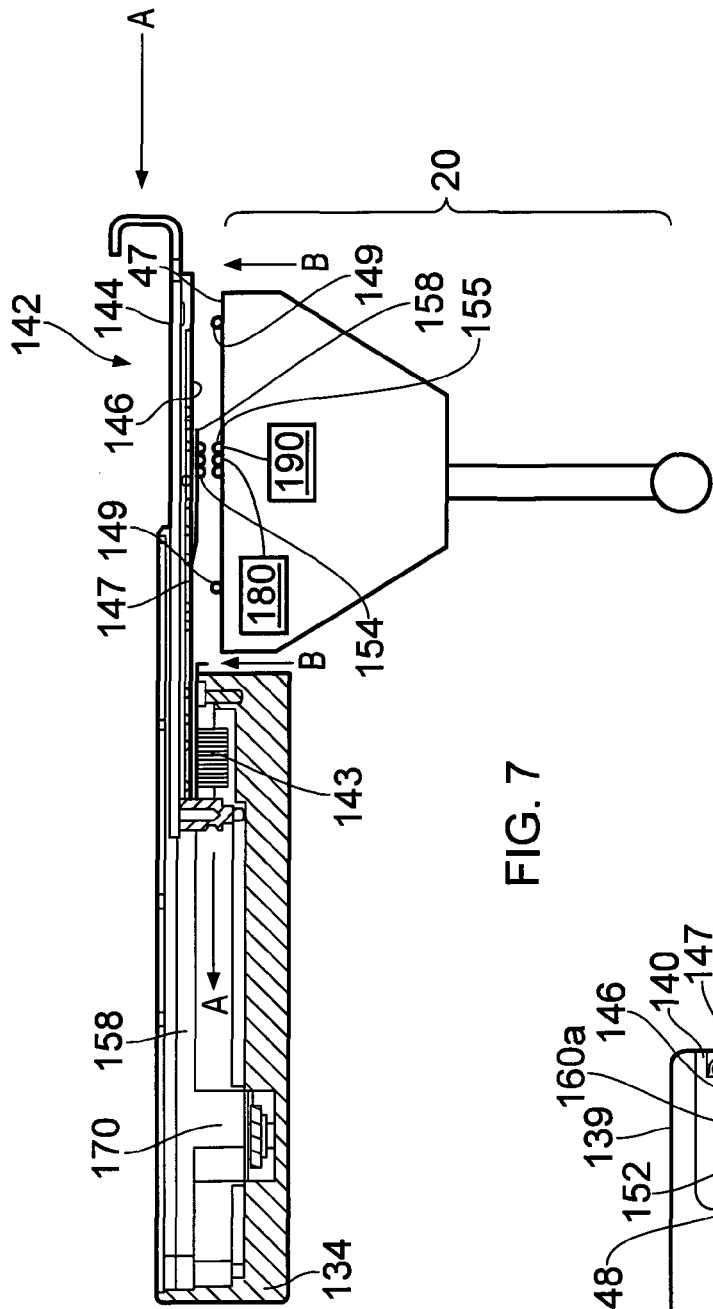
FIG. 7 is a cross-sectional view of the receptacle housing shown in FIG. 6.
Figure 6:
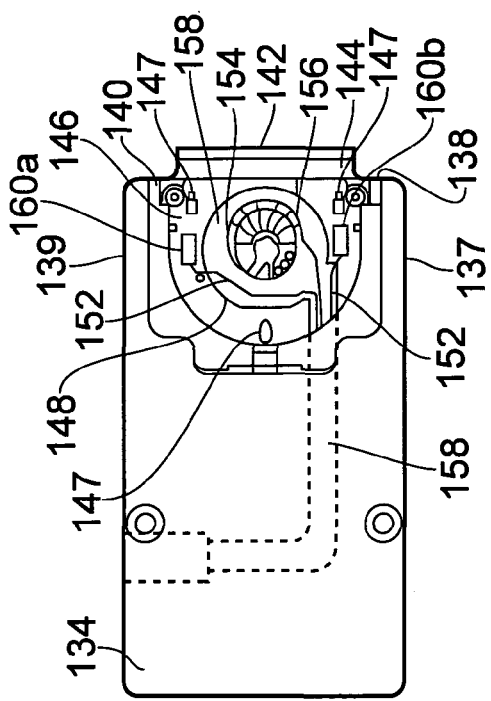
FIG. 6 is a plan, underside view of a receptacle housing of the storage apparatus shown in FIG. 5.

With reference to FIGS. 5 to 7, there is shown a storage apparatus 104 according to a second embodiment of the present invention. The storage apparatus 104 illustrated in FIGS. 5 to 7 is similar to the storage apparatus 4 illustrated in FIGS. 2 to 4, and like parts share like reference numerals. The storage apparatus 104 shown in FIGS. 5 to 7 is particularly suitable for storing metrological devices which contain electrical components.

The storage apparatus 104 comprises a storage unit 126 and a temperature control device 127. The storage unit 126 comprises upright supports 30 mounted to the base 5 of the CMM 2 and a rack 32 supporting a receptacle housing 134. The receptacle housing 134 has a single receptacle 136 for receiving a metrological device such as a measurement probe, stylus, module or a tool bit.

The receptacle 136 comprises first 137 and second 139 side walls defining first 138 and second 140 directly opposing ribs for cooperation with corresponding grooves on a metrological, device, such as the measurement probe 20, to be received in the receptacle.

The receptacle 136 also comprises a protective cover 142 extending between the first 137 and second 139 side walls. The protective cover 142 is biased into the closed position by a spring 143 but can be pushed into the receptacle housing 134 in the direction illustrated by arrow A. This enables the measurement probe 20 to be slid into the receptacle 136 via the head 10 which is holding the measurement probe 20 from the measurement probe's 20 contact face.

Referring to FIGS. 6 and 7 the receptacle 136 includes a protective cover 142. The protective cover 142 comprises an outer shell 144 made of a plastics material such as rigid PVC, and a heat transfer plate 146 made of a metallic, magnetic material such as magnetised stainless steel, a contact assembly 148 and a heat source comprising first 160a and second 160b heating elements.

The heat transfer plate 146 comprises three locating openings 147 which cooperate with three corresponding locating projections 149 on the measurement probe's 20 contact face 47 as explained in more detail below.

The contact assembly 148 comprises a plurality of electrical contacts 154 which are electrically connected to the temperature control system 127 via wires 156. The electrical contacts 154 and wires 156 are mounted on a flexible support arm 158 so that the electrical contacts 154 have some degree of freedom relative to the outer shell 144. The electrical contacts 154 are configured to contact corresponding electrical contacts 155 on a measurement probe 20 received in the receptacle 136. In one preferred embodiment, power is supplied to electrical components (not shown) contained in the measurement probe 20 via the electrical contacts 154 and 155. This enables the electrical components in the measurement probe 20 to be kept in ready mode, ready for use by a CMM 2. Optionally, the electrical contacts 154 and 155 can be used to transfer data to and/or from the measurement probe 20. For instance, the measurement probe 20 could include a temperature sensor 180 and the electrical contacts 154 and 155 could be used to transfer data from the temperature sensor to the temperature control unit 127. In another preferred embodiment, the electrical contacts 154 and 155 are used to supply power to a heat source 190 in the measurement probe 20 in order to maintain the temperature of the measurement probe 20 at its operating temperature.

The first 160a and second 160b heating elements are resistors which are electrically connected to the temperature control system 127 via wires 152. The wires 152 for the heating element are mounted on the flexible support arm 158. As will be understood, the preferred resistance of each of the resistors will depend on many factors such as the application in which the apparatus is used, and the required temperatures the apparatus is to work with. The first 160a and second 160b heating elements are mounted on the heat transfer plate 146. Accordingly, in use the heating elements directly heat the measurement probe 20 received in the receptacle 136. The heat transfer plate 146 also warms due to the heat from the first 160a and second 160b heating elements and this helps to uniformly heat the measurement probe 120 received in the receptacle over its entire area rather than, just at specific points.

The measuring probe 20 has magnets (not shown) located towards its contact face 47 such that when the measuring probe 20 is received in the receptacle 136, the measuring probe 20 is urged towards the heat transfer plate 146 in the direction shown by arrow B. The measuring probe 20 is shown spaced apart from the heat transfer plate 146, but in use the measuring probe 20 will be magnetically attracted towards the protective cover 142 so that the locating projections 149 will be received in the locating openings 147 on the heat transfer plate 146. This ensures that the electrical connectors 154, 155 on the heat transfer plate 146 and measuring probe 20 are co-located. The locating openings 147 and the locating projections 149 are configured such that when the locating projections 149 are received in the locating openings 147, the contact face 47 of the measuring probe 20 is spaced a small distance away from the heat transfer plate 146.

The protective cover 42 is mounted so that it can slide, along rails (not shown), into the receptacle housing 134 in the direction illustrated by arrow A. A spring 143 is fastened to the protective cover 142 and to the receptacle housing 134 such that the spring 143 biases the protective cover 142 towards the closed position. The flexible arm 158 on which the wires 152, 156 for the heating elements 160*a*, 160*b* and the electrical contacts 154 are mounted is configured to roll along its length as the protective cover 142 is retracted into the receptacle housing 134. This helps to prevent the flexible arm 158 from breaking and also from jamming the protective cover 142 within the receptacle housing 134.

Figure 8:
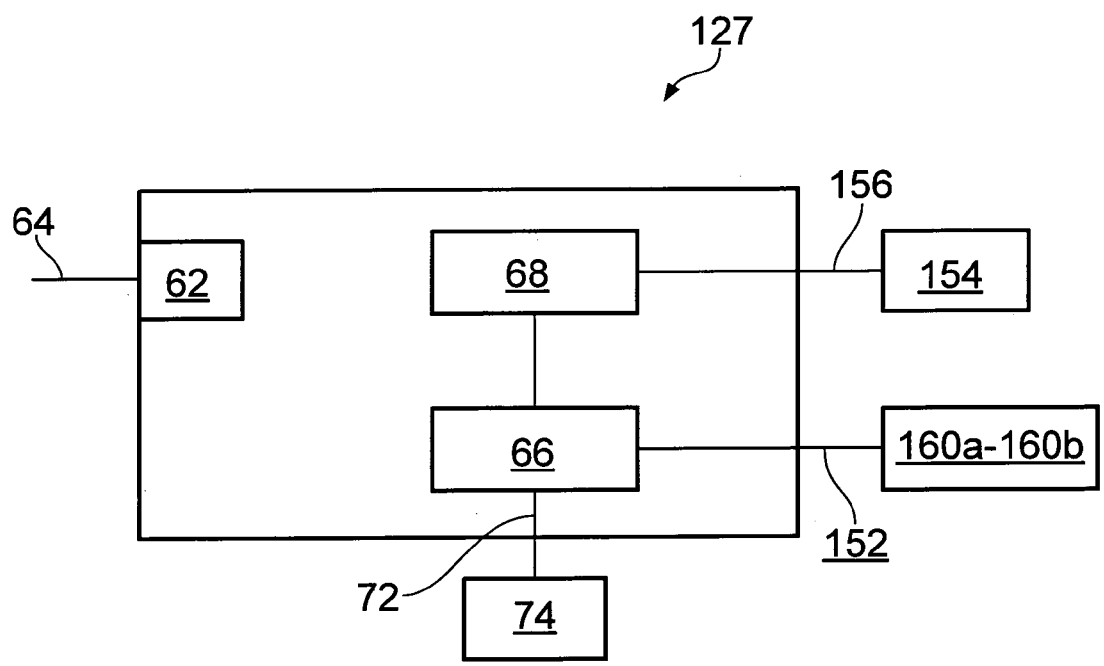
FIG. 8 is a schematic illustration of the temperature control device of the storage apparatus shown in FIGS. 5 to 7.

Referring to FIG. 8, a temperature control device 127 for a storage apparatus 104 according to FIGS. 5 to 7 is illustrated. The temperature control device 127 comprises a power supply unit (PSU) 62 which receives power from a mains supply 64, a temperature controller 66, and a probe power switcher 68.

The temperature controller 66 is configured to output power to a heat source such as first 160*a* and second 160*b* heating elements on the output line 152 in order to heat the heating elements. The temperature controller 66 can receive a signal from an input device 74 on input line 72 which can be used by the temperature controller 66 to determine how much power to output along output line 52 to the heat source. In one preferred embodiment the input device 74 is a switch which can be operated by a user to select how much power to output. In other embodiments, the input device 74 can be a temperature sensor mounted on the receptacle 136 which indicates the operating temperature of the measurement probe 20 received in the receptacle 136. Accordingly, in these cases, the temperature controller 66 is configured to determine how much power to provide to the heat source in order to maintain the temperature of the measurement probe 20 based on the input from the input device 74. In a further embodiment, the temperature controller 66 can receive a signal indicative of the operating temperature of a measurement probe 20 from a temperature sensor 180 located in the measurement probe via the probe power switch 68 which can receive data from the measurement probe along line 156.

Accordingly, as will be understood, depending on the user's requirements the temperature controller 66 could be configured to maintain the temperature of a measurement probe at a constant temperature. In this case the temperature controller 66 will be configured to take action to compensate for changes in, for example the ambient temperature. This could be done by measuring the ambient temperature or by measuring the temperature of the measurement probe itself, and changing the output of the heating elements accordingly. Optionally, the temperature controller 66 could be configured to maintain the temperature of the measurement probe at a differential to the ambient temperature. The differential could be a constant differential or could vary depending on the user's requirements.

The probe power switcher 68 is connected to the electrical connectors 154 via the wires 156 and is configured to determine when the electrical connectors 154 are in contact with connectors 155 on the measurement probe 20. The probe power switcher 68 is also configured to supply power to the measurement probe 20 via the electrical connectors 154 in order to keep the electrical components in the measurement probe 20 in a ready mode.

The temperature controller device 27 for a storage apparatus 4 as illustrated in FIGS. 2 to 4 will be similar to that shown in FIG. 6 except that it need not include the probe power switcher 68 nor the output line 156. Also, as will be understood, the temperature controller 66 will be connected to respective heat sources and electrical connectors in each of the receptacles 36*a*, 36*b*, 36*c*, and will be able to control each heat source and each set electrical connectors independently from each other.

In use, a measuring probe 20 that is loaded on a head 10 is stored in a receptacle, for example the receptacle 136 illustrated in FIGS. 5 to 7, by moving the measuring probe 20 into the receptacle in the direction indicated by arrow A (see FIG. 5) such that the grooves in the measuring probe 20 engage the ribs 138, 140 in the receptacle. In doing so the head 10 pushes the protective cover 142 into the receptacle housing 134. The head 10 and measuring probe 20 are held together via corresponding magnets (not shown). Accordingly, in order to disengage the head 10 from the measuring probe 20, the CMM 2 moves the head 10 vertically in order to pull the head 10 away from the measuring probe 20 so as to disengage the magnets. The head 10 is then moved away from the receptacle 136 so that the protective cover 142 moves back into its closed position under the bias of the spring 143. The magnets (not shown) in the measuring probe 20, are attracted to the magnetic heat transfer plate 142 and so the measuring probe 20 is pulled upwards into contact with the heat transfer plate 142, thereby making electrical contact between the electrical connectors 154 on the contact assembly 148 and the electrical connectors 155 on the measurement probe 20 as described above.

The probe power switcher 68 detects the establishment of the contact between the corresponding electrical connectors 154, 155 and provides power to the electrical components within the measurement probe 20. Meanwhile, the temperature controller 66 supplies power to the first 160*a* and second 160*b* heating elements in order to heat the measurement probe 20, thereby maintaining measurement probe 20 at a predetermined temperature. As described above, the predetermined temperature can be a constant temperature. Optionally, the predetermined temperature could be a predetermined fluctuating temperature, for instance a predetermined temperature differential relative to the ambient temperature.

When the measurement probe 20 is to be loaded onto a head 10 for use in a CMM 2, the head 10 is moved into the protective cover 142 so as to slide it into the receptacle housing 134. In doing so, this breaks the electrical contact between the electrical connectors 154 on the contact assembly 148 and the electrical connectors on the measurement probe 20, and also disengages the magnets on the measurement probe 20 from the magnetic heat transfer plate 146. Accordingly, the measurement probe 20 is held in the receptacle by the engagement between the receptacle's ribs 138 and 140 and the corresponding grooves on the measurement probe 20. Once the head's 10 magnets and the corresponding magnets on the measurement probe 20 are aligned, the head 10 picks up the measurement probe 20 and slides the measurement probe 20 out of the receptacle.

As the measurement probe 20 has been kept at its operating temperature by the storage apparatus 104, it is not necessary to wait for the measurement probe 20 to warm up to its operating temperature. Accordingly, the measurement probe 20 can be used in a measuring operation immediately.

The invention claimed is:

1. A storage apparatus for a measurement probe for use with a coordinate positioning machine, comprising:
   a storage unit having at least one receptacle for a measurement probe; and
   at least one temperature source for controlling a temperature of a measurement probe when a measurement probe is located in the at least one receptacle, the at least one temperature source being configured to target at least a part of a region of the measurement probe that is configured to engage the coordinate positioning machine.

2. The storage apparatus as claimed in claim 1, in which the at least one temperature source is configured to target a first end of a measurement probe located in the at least one receptacle.

3. The storage apparatus as claimed in claim 1, in which at least a part of the at least one temperature source is displaceable relative to the at least one receptacle.

4. The storage apparatus as claimed in claim 3, in which the at least a part of the at least one temperature source is displaceable relative to the at least one receptacle between a closed position in which the at least one temperature source extends over a selected portion of a measurement probe located in the at least one receptacle and an open position in which the selected portion of a measurement probe located in the at least one receptacle is exposed.

5. The storage apparatus as claimed in claim 1, in which the at least one temperature source comprises at least one temperature element and at least one temperature conducting arm, in which at least the at least one temperature conducting arm is displaceable to the at least one receptacle.

6. The storage apparatus as claimed in claim 5, in which the at least one temperature element is provided separate to the at least one temperature conducting arm such that the at least one temperature conducting arm is displaceable relative to the at least one temperature element.

7. The storage apparatus as claimed in claim 5, in which the at least one temperature element is fixed relative to the at least one temperature conducting arm.

8. The storage apparatus as claimed in claim 1, further comprising:
   a temperature control device configured to control the at least one temperature source.

9. The storage apparatus as claimed in claim 8, in which the temperature control device is configured to control the temperature so as to maintain the temperature of a measurement probe located in the at least one receptacle substantially at a predetermined temperature.

10. The storage apparatus as claimed in claim 9, in which the predetermined temperature is an operating temperature of the measurement probe.

11. The storage apparatus as claimed in claim 10, in which the temperature control device is configured to receive from a temperature sensor a signal indicative of the operating temperature of a measurement probe located in the at least one receptacle and is configured to control the at least one temperature source in order to maintain the temperature of the measurement probe at the operating temperature.

12. The storage apparatus as claimed in claim 11, in which the temperature control device is configured to receive the signal indicative of the operating temperature of a measurement probe located in the at least one receptacle from a temperature sensor located in the storage unit.

13. The storage apparatus as claimed in claim 11, in which the temperature control device is configured to receive the signal indicative of the operating temperature of the measurement probe from a temperature sensor located in the measurement probe.

14. The storage apparatus as claimed in claim 1, in which the storage unit comprises at least one electrical connector for supplying electric power to at least one electrical component in a measurement probe located within the at least one receptacle.

15. The storage apparatus as claimed in claim 14, in which the at least one electrical connector is configured to connect with the measurement probe's at least one coordinate positioning machine power supply connector.

16. The storage apparatus as claimed in claim 1, in which the at least one temperature source comprises a heat source.

17. The storage apparatus as claimed in claim 16, in which the heat source is a resistor.

18. The kit comprising a storage apparatus as claimed in claim 1 and a measurement probe allocated in the at least one receptacle.

19. The storage apparatus as claimed in claim 1, the at least one temperature source being configured to target a face of the measurement probe that is configured to engage the coordinate positioning machine.

20. A method of storing a measurement probe for use with a coordinate positioning machine in a storage unit, comprising:
   locating the measurement probe in the storage unit, the storage unit having at least one temperature source configured to target at least a part of a region of the measurement probe that is configured to engage the coordinate positioning machine; and
   controlling a temperature of the measurement probe via the at least one temperature source.

21. The method as claimed in claim 20 in which the method comprises maintaining the temperature of the measurement probe substantially at a predetermined temperature.

22. The method as claimed in claim 21 in which the predetermined temperature is an operating temperature of the measurement probe.

23. The method as claimed in claim 20, the at least one temperature source being configured to target a face of the measurement probe that is configured to engage the coordinate positioning machine.

24. A storage apparatus for a measurement probe for use with a coordinate positioning machine, comprising:
   a storage unit having at least one receptacle for a measurement probe; and
   at least one temperature source for controlling the temperature of a measurement probe when a measurement probe is located in the at least one receptacle, the at least one temperature source being configured to target a region of the measurement probe that is configured to engage the coordinate positioning machine.

25. A kit comprising a storage apparatus as claimed in claim 24 and a measurement probe allocated in the at least one receptacle.

* * * * *